E. R. BUTTS.
COLLAPSIBLE LIGHT AND RAIN SHIELD FOR VEHICLES.
APPLICATION FILED JULY 28, 1920.
1,393,080.
Patented Oct. 11, 1921.
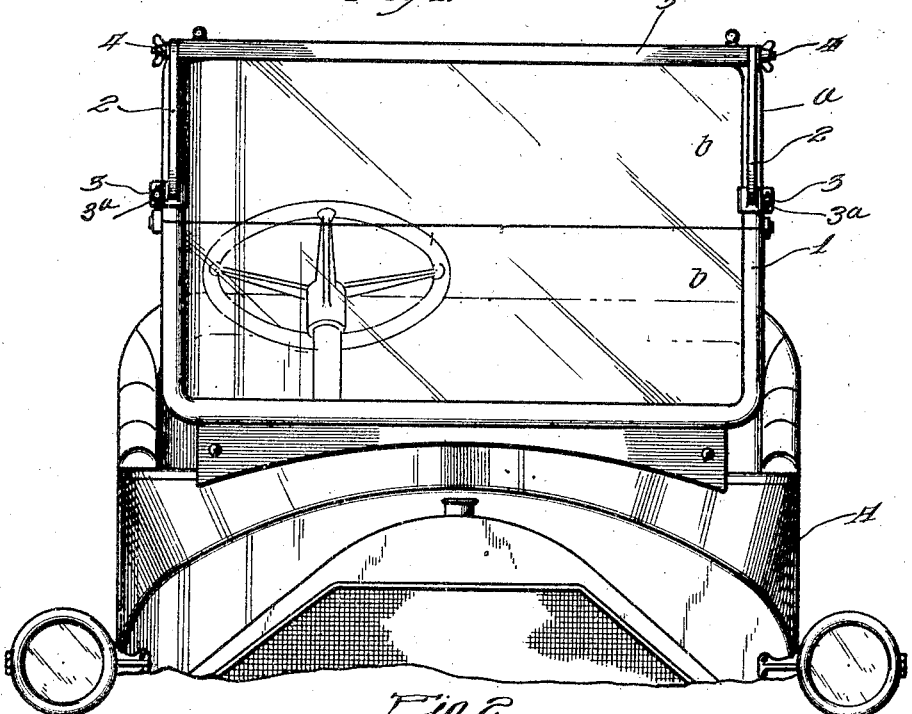
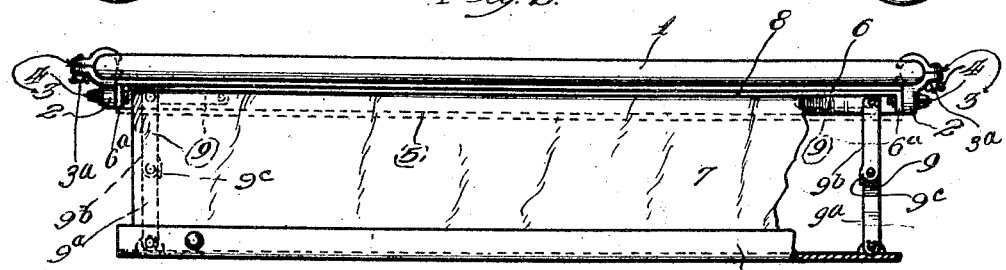
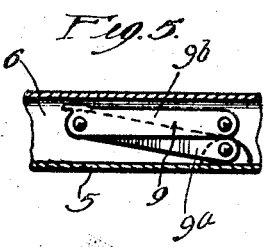 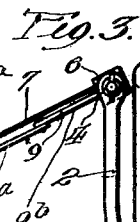 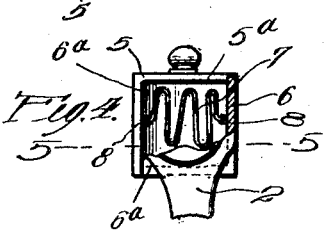
WITNESS:
INVENTOR.
Eugene R. Butts.
BY
his ATTORNEY.

UNITED STATES PATENT OFFICE.

EUGENE R. BUTTS, OF CHICAGO, ILLINOIS.

COLLAPSIBLE LIGHT AND RAIN SHIELD FOR VEHICLES.

1,393,080. Specification of Letters Patent. Patented Oct. 11, 1921.

Application filed July 28, 1920. Serial No. 399,549.

*To all whom it may concern:*

Be it known that I, EUGENE R. BUTTS, a citizen of the United States, and a resident of Chicago, Cook county, and State of Illinois, have invented certain new and useful Improvements in Collapsible Light and Rain Shields for Vehicles, of which the following is declared to be a full, clear, and exact description.

The principal object of the invention is to provide an efficient and comparatively simple collapsible shield for protection against light, rain, snow, or sleet, by keeping water, snow, or ice from the wind shields of motor vehicles, aeroplanes, motor boats and the like, and also to act as a shade against strong rays of sun or artificial lights. Another object is to provide a collapsible shield of this character, which can be readily attached to wind shields such as are commonly employed on motor vehicles, and which, when folded or collapsed, occupies little space, and when in use does not obscure the view but protects the wind shield against rain, snow and sleet, and protects the driver against strong rays of sun or artificial light. The invention consists in the several novel features hereinafter fully set forth and claimed.

The invention is clearly illustrated in the accompanying drawing in which:—

Figure 1 is a front elevation of a shield embodying a simple form of the present invention, applied to the wind shield of an automobile and showing the shield in collapsed condition; Fig. 2 is a plan of the shield and the wind shield frame of the automobile, showing the shield in operative or extended position; Fig. 3 is a side elevation of the parts seen in Fig. 2; Fig. 4 is an enlarged side elevation of the shield partly broken away, and Fig. 5 is a detail, fragmental, horizontal section taken on line 5—5 of Fig. 4 showing certain links for connecting the two parts of the casing of the shield.

Referring to said drawing the reference character A designates a motor vehicle, which may comprise an automobile of the pleasure or truck type, or it may comprise an aeroplane, a motor boat or other power driven vehicle. The wind-shield is illustrated at 1, and may comprise any of the well known types commonly used on motor driven vehicles. As is customary, a frame $a$ is provided for supporting the glass plates $b$.

The shield forming the subject matter of this invention is supported on the vehicle by brackets 2 which may be detachably secured to the wind-shield frame by clamp members 3 that are arranged to clamp on the wind-shield frame. The clamp members may be secured to the upright members of the wind-shield frame by thumb screws $3^a$ as shown.

Secured to, and extending between the brackets 2, is one member 6 of the casing of the device, which member, for convenience, may comprise an angle or L shaped bar, having ends $6^a$ that are secured to the brackets 2 by bolts and wing nuts 4. The bolts and wing nuts 4 further furnish means whereby the shield may be adjusted and tilted to any desired angle to the plane of the wind shield 1. The other member of the casing may comprise an angle or L shaped bar 5 arranged to extend parallel with the bar 6 and permanently connected thereto by adjustable connections here shown as comprising a plurality of links 9 which are arranged in pairs, the two links $9^a$, $9^b$ of each pair being pivotally connected together, and their other ends being pivotally connected to the casing members 5, 6. A shoulder or stop $9^c$ is provided on one link of each pair, adjacent their pivotal connection, which shoulder is arranged to engage the other link of the pair when they are straightened.

Secured to and extending between the casing members 5, 6, is a curtain or shade 7 which may be made of flexible material, such as waterproofed cloth, canvas or the like and preferably made opaque or translucent so as to intercept light rays that would otherwise pass through the wind-shield. It is preferably made of waterproofed material so as to be impervious to water. The curtain is secured to the casing member 5 at a place below its upper side or flange $5^a$ whereby a gutter or trough is left between said side or flange $5^a$ and the curtain 7 into which any water may run which falls on the curtain, thus preventing the water from collecting on the wind-shield glass. Obviously, the water will run out of the trough at the ends thereof and thus keep the wind-shield glass clear and unobstructed. Conveniently, the front and rear edges of the curtain may have binders 8—8 secured thereon which may be attached to the casing members 5, 6 in any suitable manner.

With the use of angle or L shaped casing members, the two may form an inclosure for the curtain, as seen in Fig. 4 when the device is collapsed, but this form of casing is immaterial to the invention broadly considered as any desirable shape of casing members may be used.

When not in use the front casing member is pushed back against the rear one, thereby inclosing the curtain. In this position it occupies but little space, directly in front of the horizontal top member of the windshield, and it does not obstruct the view in any manner. To use the device as a protection against rain, snow or sleet, or from the light rays of the sun or artificial light, the front casing member 5 is drawn forward, thereby straightening out the links 9 and unfolding the curtain 7. By making the curtain of the proper width the links may be swung slightly beyond the dead center and the tension of the curtain on the casing members 5, 6, will tend to hold the parts in extended position. The friction of the joints may be made sufficient to hold the parts in position when extended or collapsed. The shield may be tilted to any desired angle and forms an efficient rain shield.

Obviously, the bracket 2 may be made of suitable length and shape to accommodate the shield to various makes of wind-shields or other frames and the casing may be made of lengths to fit any of the various types and sizes commonly in use.

The main advantages gained by the invention are: the ease with which it is attached to or detached from wind-shields; the ease with which it is adjusted; the small space it occupies when collapsed or folded up, and the protection it affords against strong rays of sunlight or artificial light, and against rain, snow or sleet, thereby leaving the wind-shield clear and unobstructed, whereby the driver may see freely through the windshield during storms when the sight is usually obscured for the driver.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A shield of the character described, comprising a casing member, a bar extending parallel with said casing member, non-detachable and adjustable bar supporting connections between said casing member and bar, and a curtain secured to said casing member and bar.

2. A shield of the character described, comprising a casing member, having brackets whereby it is secured to a wind-shield frame, a bar extending parallel with said casing, adjustable bar supporting connections permanently secured to said casing member and bar, and a curtain secured to said casing member and bar, said casing member being adapted to contain said bar supporting connections.

3. A shield of the character described, comprising supporting brackets, a casing member rotatively mounted on said brackets, a bar extending parallel with said casing member, adjustable connections between said casing member and bar permanently secured thereto, and a curtain secured to said casing member and bar, said casing member being adapted to contain said adjustable connections.

4. A shield of the character described, comprising supporting brackets, an angle shaped casing member secured to said brackets, an angle shaped bar coöperating with said casing member to form an inclosure, adjustable supporting connections between said casing member and bar, and a curtain secured to said casing member and bar and capable of being confined in said inclosure.

5. A shield of the character described, comprising supporting brackets, a casing member secured to said brackets, a bar extending parallel with said casing member, pivoted together, link connections permanently secured to and extending between said casing member and bar whereby said bar is supported in positions adjacent to and away from said casing member, and a curtain secured to and extending between said casing member and bar.

6. A shield of the character described, comprising supporting brackets, a casing member rotatively secured to said brackets, a bar extending parallel with said casing member, link connections permanently secured to and extending between said casing member and bar whereby said bar is supported in positions adjacent to and away from said casing member, and a curtain secured to and extending between said casing member and bar, said casing member being adapted to contain said link connections.

7. A shield of the character described, comprising supporting brackets having clamp members whereby they are detachably secured to a wind-shield frame, a casing member secured to said brackets, a bar extending parallel with said casing member, link connections permanently secured to and extending between said casing member and bar whereby said bar is supported in positions adjacent to and away from said casing member, and a curtain secured to and extending between said casing member and bar, said casing member being adapted to contain said link connections.

8. A shield of the character described, comprising supporting brackets, having clamp members whereby they are detachably secured to a wind-shield frame, a casing member rotatively secured to said brackets, a bar extending parallel with said casing member, link connections permanently secured to and extending between said casing member and bar whereby said bar is supported in positions adjacent to and away from said casing member, and a curtain secured to and extending between said casing member and bar, said casing member being adapted to contain said link connections.

9. A shield of the character described, comprising an angle shaped casing member, an angle shaped bar extending parallel therewith, adjustable connections permanently secured to and extending between said casing member and bar, and a curtain secured to said casing member and bar, there being a trough formed between said bar and curtain for carrying off water falling upon the curtain, and said casing member and bar being adapted to contain said adjustable connections and curtain.

EUGENE R. BUTTS.